United States Patent [19]

Yoshiji et al.

[11] Patent Number: 4,721,005
[45] Date of Patent: Jan. 26, 1988

[54] ROBOT APPARATUS

[75] Inventors: Takeo Yoshiji, Sakado; Kimitake Uzuyama, Sayama; Nobuyoshi Shimada; Takayuki Hoshino, both of Kawagoe, all of Japan

[73] Assignee: Honda Giken Kogyo Kabushiki Kaisha, Tokyo, Japan

[21] Appl. No.: 870,999

[22] Filed: Jun. 5, 1986

[30] Foreign Application Priority Data

Jun. 6, 1985 [JP] Japan .................. 60-123304

[51] Int. Cl.$^4$ .......................... B25J 5/02; G05G 11/00
[52] U.S. Cl. ...................... 74/479; 414/749; 901/16
[58] Field of Search ............... 74/479; 248/DIG. 13; 414/749, 751; 318/575; 901/16

[56] References Cited

U.S. PATENT DOCUMENTS

| | | |
|---|---|---|
| 4,005,782 | 2/1977 | Crockett . |
| 4,089,293 | 5/1978 | Lyons .................. 901/16 X |
| 4,229,136 | 10/1980 | Panissidi . |
| 4,260,319 | 4/1981 | Motoda et al. . |
| 4,534,006 | 8/1985 | Minucciani et al. ........... 901/16 X |
| 4,571,149 | 2/1986 | Soroka et al. .................. 901/16 |
| 4,573,861 | 3/1986 | Aschauer .................... 414/751 |
| 4,583,909 | 4/1986 | Yamashita et al. .......... 901/16 X |
| 4,588,872 | 5/1986 | Bollinger et al. ............. 318/575 |
| 4,600,358 | 7/1986 | Graf ............................ 901/16 |

FOREIGN PATENT DOCUMENTS

| | | | |
|---|---|---|---|
| 55-45563 | 3/1980 | Japan | .................. 901/16 |
| 55-128377 | 10/1980 | Japan | .................. 901/16 |
| 57-21290 | 2/1982 | Japan . | |
| 57-194891 | 11/1982 | Japan . | |

Primary Examiner—Allan D. Herrmann
Attorney, Agent, or Firm—Birch, Stewart, Kolasch & Birch

[57] ABSTRACT

A robot apparatus is operable in a Cartesian coordinate system for moving a workpiece gripped by a hand thereof. The robot apparatus includes a self-propelled X-axis slide unit movably mounted on an X-axis rail unit extending in the direction of the X-axis of the Cartesian coordinate system. A Y-axis slide unit extending in the Y-axis direction normal to the X-axis direction has one end fixed to the X-axis slide unit. A self-propelled Z-axis slide unit is movably mounted on the Y-axis slide unit, and a slide base to which the robot hand is attached is mounted on the Z-axis slide unit. Lead wires connected to drive mechanisms for driving the X-axis slide unit, the Y-axis slide unit, and the Z-axis slide unit pass through case members, and are housed in the X-axis rail unit and connected to a terminal box secured to an end of the X-axis rail unit. The X-axis, Y-axis, and Z-axis slide units are prevented from interfering with the respective tracks of other units during operation of the robot apparatus, so that the working envelope of the robot apparatus can be increased.

4 Claims, 6 Drawing Figures

ROBOT APPARATUS

BACKGROUND OF THE INVENTION

The present invention relates to a robot apparatus, and more particularly to a robot apparatus including tracks along the X-, Y-, and Z-axes of a Cartesian coordinate system, the robot apparatus being designed to prevent the tracks from interfering with each other and thereby increasing the working area or envelope of the robot itself and have being capable of continuous use for a long period of time.

Recent years have seen widespread use of robot apparatus which automatically perform verious operations for mass-production and have higher efficiency. One good example of such robot apparatus is an automatic line production system having an array of robots of one type of different types.

Some of such robot apparatus have drive mechanisms displaceable in the three directions of the X-, Y-, and Z-axes of a Cartesian coodinate system for a larger working envelope so that they can effect various steps of an operation. Japanese Laid-Open Patent Publication No. 57-21290, for example, discloses a conventional robot apparatus that is displaceable in the directions of such three axes.

The disclosed conventional robot apparatus is illustrated in FIG. 1 of the accompanying drawings. The robot apparatus includes a support post 2 supporting, on its upper end portion, two arms 4a, 4b which extend in different directions. On the arms 4a, 4b, there is supported a horizontal X-axis rail unit 6 with an X-axis drive mechanism 8 secured to one end thereof. A cable 10, which may be a wire, is trained around the X-axis drive mechanism 8 and a pulley 7 rotatably mounted on the other end of the X-axis rail unit 6, the cable 10 being coupled to an X-axis slider 12 movable on and along the X-axis rail unit 6. The X-axis slider 12 has a Z-axis drive mechanism 14 to which there is secured a Z-axis rail unit 16 extending vertically in perpendicular relation to the X-axis rail unit 6. A cable 18, which may be a wire, is trained around a pair of pulleys 17 rotatably mounted on the opposite ends of the Z-axis rail unit 16. The cable 18 is also trained around the Z-axis drive mechanism 14 and connected to a Z-axis slider 20 movable on and along the Z-axis rail unit 16. The Z-axis slider 20 has a Y-axis drive mechanism 22. A horizontal Y-axis rail unit 24 has one end fixed to the Z-axis slider 20 and extends substantially perpendicularly to the X-rail unit 6 and the Z-axis rail unit 16. A Y-axis slider 26 is movably mounted on the Y-axis rail unit 24 and coupled to a cable 28, which may be a wire, trained around the Y-axis drive mechanism 22 and a pulley 27 rotatably mounted on the other end of the Y-axis rail unit 24. A chuck device or a holder 30 for holding a workpiece (not shown) is mounted on the Y-axis slider 26.

Operation of the robot apparatus thus constructed is as follows: When the X-axis drive mechanism 8 is driven, the cable 10 is moved thereby to displace the X-axis slider 12 horizontally along the X-axis rail unit 6 in the X-axis direction. When the cable 18 is moved by the Z-axis drive mechanism 14, the Z-axis slider 20 is displaced vertically along the Z-axis rail unit 16 in the Z-axis direction. Movement of the cable 28 caused by the Y-axis drive mechanism 22 enables the Y-axis slider 26 to move horizontally along the Y-axis rail unit 24 in the Y-axis direction until the holder 30 reaches a desired position in which a workpiece (not shown) is located.

After the workpiece is gripped by the holder 30, the X-axis drive mechanism 8, the Y-axis drive mechanism 22, and the Z-axis drive mechanism 14 are driven to move the workpiece to a desired position.

With the aforesaid prior arrangement, the holder 30 can be moved by the drive mechanisms 8, 22, 14 in any desired direction in the Cartesian coordinate system having X-, Y-, and Z-axes. However, as is readily understood from FIG. 1, since the Z-axis rail unit 16 is fixed to the X-axis slider 12 and extends vertically, the Z-rail unit 16 is required to move in the X-axis direction when the holder 30 is moved in the X-axis direction. This leads to a problem in that the space required for the Z-rail unit 16 to move in is quite large, limiting the space area in which to move the workpiece in the Y-axis direction. As a result, the directions in which to move the workpiece or the positions in which to install the robot apparatus are limited, and smaller working spaces cannot accommodate the robot apparatus. The sliders are moved by the cables or wires. Therefore, the cables are apt to be elongated and worn in use, and have to be replaced periodically to meet desired accuracy requirements. For this reason, the robot apparatus cannot be operated continuously for a long period of time, and hence cannot perform automated tasks efficiently.

Another known robot apparatus is disclosed in Japanese Laid-Open Patent Publication No. 57-194891. According to this prior robot apparatus, a rail unit extending along one of the three axes of a Cartesian coordinate system, for example, an X-axis rail unit extending in the X-axis direction, is secured to a fixed table, and an X-axis movable body is mounted by a rack and pinion on the X-axis rail unit. A holder body is secured to the X-axis movable body, and a Z-axis movable arm is mounted by a rack and pinion on the holder body for movement vertically in the Z-axis direction. To the upper end of the Z-axis movable arm, there is fixed another holder body mounting thereon a Y-axis movable arm through a rack and pinion, the Y-axis movable arm being movable in the Y-axis direction. A measuring or gripping head is mounted on one end of the Y-axis movable arm.

The measuring or gripping head can be moved in the directions of the three coordinate axes by moving the X-axis movable body, the Z-axis movable arm, and the Y-axis movable arm through the respective rack and pinions.

However, when the head is to be moved vertically in the Z-axis direction, the Y-axis movable arm extending in the Y-axis direction is also required to be moved in the Z-axis direction. Therefore, as with the prior art robot apparatus shown in FIG. 1, the space taken up by the robot apparatus for moving the head is of a substantially size.

U.S. Pat. No. 4,005,782 discloses still another conventional robot apparatus. A Y-axis movable body movable by a cylinder is mounted on a guide rod extending in the Y-axis direction in a Cartesian coordinate system. Another guide rod extending in the X-axis direction has one end secured to the Y-axis movable body, and an X-axis movable body movable by a cylinder is connected to the guide rod. A cylinder oriented vertically in the Z-axis direction is fixed to the X-axis movable body. A Z-axis movable body is coupled to a rod extending vertically downwardly from the cylinder fixed to the X-axis movable body. A hand is openably and closably mounted on the Z-axis movable body.

This prior-art robot apparatus is advantageous in that since no guide rod extends in the Z-axis direction, a workpiece gripped by the hand can be moved easily in any desired direction.

The Y-axis movable body, the X-axis movable body, and the Z-axis movable body are movable in the Y-axis, X-axis, and Z-axis directions respectively by their cylinders. If the ranges of movement of these movable bodies are to be increased for moving various different workpieces, then the cylinders have to be increased in length, and hence the robot apparatus results in a larger size.

Another prior robot apparatus is shown in U.S. Pat. No. 4,229,136. A first holder that is vertically movable by a first motor is mounted on a Z-axis arm extending vertically in the Z-axis direction, and a cylinder mechanism for vertically moving a tool or the like is coupled to the first holder. A second holder having a second motor is secured to the first holder. An Y-axis arm extending in the Y-axis direction and movable in the Y-axis direction by the second motor is fitted in the second holder. A third holder is secured to an end of the Y-axis arm. An X-axis arm fitted in the third holder is movable in the X-axis direction by a third motor fixed to the third holder. A gripping tool, for example, is mounted on an end of the X-axis arm.

The tool can be vertically moved highly smoothly by driving the cylinder mechanism in a manner to meet the weight of the tool that is mounted on the X-axis arm.

However, since the Z-axis arm extends vertically in the Z-axis direction and the Y-axis arm, the X-axis arm, and the tool are supported on the Z-axis arm, the range in which the tool can be moved is substantially limited as with the prior art illustrated in FIG. 1.

According to a still further prior robot apparatus disclosed in U.S. Pat. No. 4,260,319, a support post is erected vertically in the Z-axis direction, and an articulated arm which is extensible and contractable by a weight adjusting means is coupled to an upper portion of the support post. A bar extending vertically downwardly is secured to an end of the articulated arm. An X-axis rail member extending in the X-axis direction through a guide is supported on the support post, and an X-axis movable member is movably mounted on the X-axis rail member through a drive means such as a wire or a rack and pinion. To the X-axis movable member, there is fixed an end of a Y-axis rail member extending in the Y-axis direction. A Y-axis movable member is movably mounted on the Y-axis rail member through a drive means. The Y-axis movable member is fitted over the rod coupled to the articulated arm for guiding the rod in a desired direction.

With the above prior robot apparatus, the rod can be moved in vertical orientation (in the Z-axis direction) at all times through the Y-axis movable member. Therefore, by holding a workpiece with a hand mounted on the lower end of the rod and driving the X-axis and Y-axis movable members in the X-axis and Y-axis directions, respectively, the workpiece can be fed accurately and quickly to a desired position.

When the rod is guided by the Y-axis movable member to move in the X-axis and Y-axis directions, however, the articulated arm is extended, contracted, and turned under the operation of the weight adjusting means. For moving the hand on the rod in the Z-axis direction at different positions in the X-axis and Y-axis directions in response to the operation of a driver of the weight adjusting means, the control of the driver is quite complex because of different attitudes of the articulated arm at such different positions in the X-axis and Y-axis directions. In addition, the vertical space occupied by the robot apparatus is large inasmuch as the articulated arm connected to the support post extends upwardly substantially beyond the X-axis and Y-axis rail members. As a consequence, the robot apparatus cannot be installed in smaller working spaces.

SUMMARY OF THE INVENTION

It is a general object of the present invention to provide a robot apparatus which can be displaced independently in the direction of three axes, i.e., X-, Y-, and Z-axes, which prevents tracks from interfering with each other by removing a rail unit extending in the direction of at least one axis among the three axes, which does not employ cables as drive mechanisms, so that it can easily be maintained and be highly durable, and which is appropriately small in size.

A primary object of the present invention is to provide a robot apparatus comprising a rail unit including a rail extending in any one of X-, Y-, and Z-axes of a Cartesian coordinate system, an X-axis slide unit movable in a first direction on the rail unit, a Y-axis slide unit mounted on the X-axis slide unit and movable in a second direction normal to the first direction, and a Z-axis slide unit mounted on a Y-axis slide unit and movable in a third direction normal to the first and second directions, the X-axis slide unit having an X-axis drive mechanism, the Y-axis slide unit having a Y-axis drive mechanism, and the Z-axis slide unit having a Z-axis drive mechanism.

Another object of the present invention is to provide a robot apparatus including a terminal box mounted on one end of the rail unit, a first case member fixed to the terminal box and the X-axis slide unit, a second case member coupled to the Y-axis slide unit, lead wires connected to the X-axis and Y-axis drive mechanisms and housed in the first case member, and a lead wire connected to the Z-axis drive mechanism and housed through the second case member in the first case member, the lead wires being connected to the terminal box.

Still another object of the present invention is to provide a robot apparatus in which the rail unit is constructed of a rail body in the form of a hollow rectangular prism, the lead wires being accommodated in the rail body.

A still further object of the present invention is to provide a robot apparatus in which the X-axis slide unit has a rotative drive source and a pinion engaging the rotative drive source, and the rail unit has a rack meshing with the pinion, whereby the X-axis slide unit can be moved by rotation of the pinion in response to operation of the rotative drive source.

Yet another object of the present invention is to provide a robot apparatus in which the Y-axis slide unit comprises a rail extending in a given direction, a body including a rotative drive source and a screw shaft engaging the rotative drive source, and a slide base operatively engaging the rail and including a nut member threaded over the screw shaft, whereby the slide base can be moved on rotation of the screw shaft in response to operation of the rotative drive source.

A yet still further object of the present invention is to provide a robot apparatus in which the Z-axis slide unit comprises a body including a rotative drive source and a screw shaft operatively engaging the rotative drive source, a nut member threaded over the screw shaft, and a rail, whereby the slide base can be moved on rotation of the screw shaft in response to operation of the rotative drive source.

Another object of the present invention is to provide a robot apparatus including a stopper member mounted on the X-axis slide unit and having a position detecting mechanism for limiting the movement of the X-axis slide unit.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
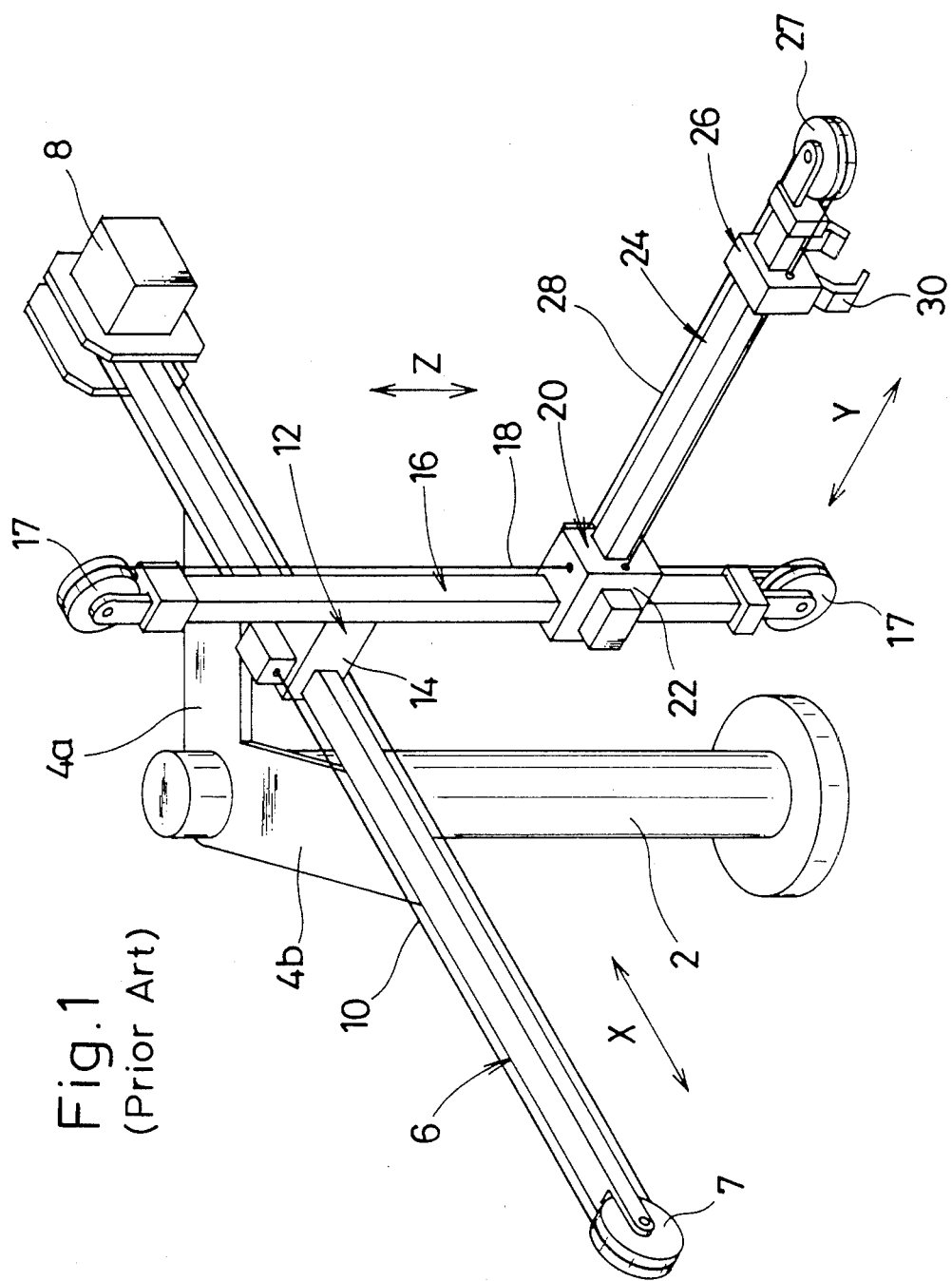
FIG. 1 is a perspective view of a conventional robot apparatus.
Figure 2:
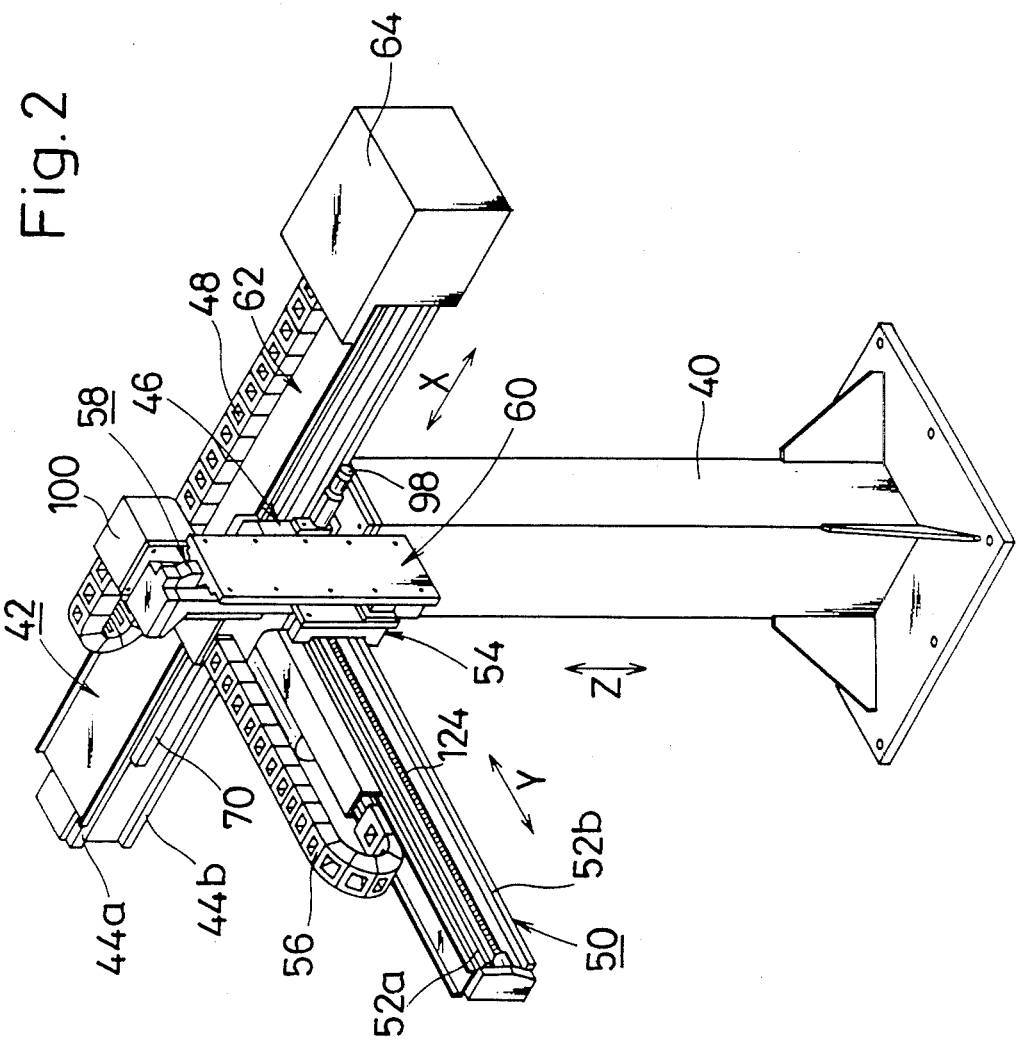
FIG. 2 is a perspective view of a robot apparatus according to the present invention.

As shown in FIG. 2, a robot apparatus according to the present invention is supported on a post unit 40. The robot apparatus includes an X-axis rail unit 42 mounted on the upper end of the post unit 40 and having a pair of parallel horizontal rail members 44a, 44b which are vertically spaced from each other. An X-axis unit 46 is movably mounted on the X-axis rail unit 42. A cable case 48 is fixed to and extends between the X-axis unit 46 and the X-axis rail unit 42. Power supply lead wires (not shown) coupled to rotative drive sources for the X-axis unit 46, a Y-axis slide unit, and a Z-axis slide unit (described below) are housed in the cable case 48. A Y-axis slide unit 50 extending perpendicularly to the X-axis rail unit 42 is secured to the X-axis unit 46. The Y-axis slide unit 50 includes a pair of rail members 52a, 52b spaced vertically from each other and extending parallel to each other, the rail members 52a, 52b engaging a Y-axis slide base 54 to which a cable case 56 is fixed. A Z-axis slide unit 58 is fixed to the Y-axis slide base 54. On the Z-axis slide unit 58, there is mounted a Z-axis slide base 60 which is movable in a direction normal to the directions in which the X-axis unit 46 and the Y-axis slide base 54 are movable. A power supply lead wire (not shown) connected to the rotative power source for the Z-axis slide unit 58 is housed in the cable case 56.

The robot apparatus which is outlined as described above will be described hereinbelow in greater detail.

Figure 4:
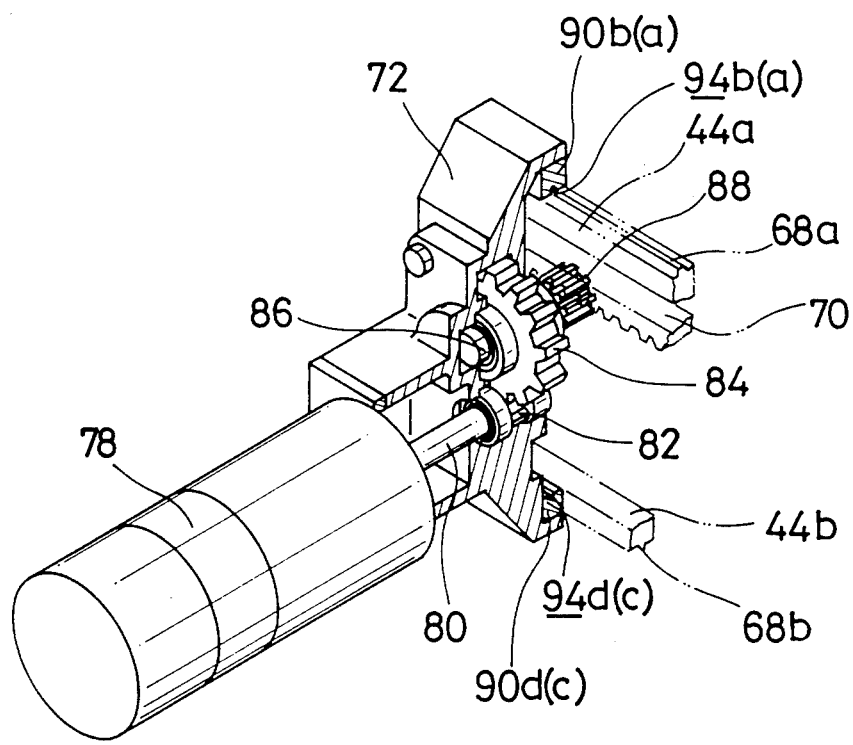
FIG. 4 is a perspective view, partly in cut away, of an X-axis unit of the robot apparatus according to the present invention.

The X-axis rail unit 42 is constructed of a rail body 62 in the form of a hollow rectangular prism. A terminal box 64 is mounted on one longitudinal end of the rail body 62 and accommodates the lead wires (not shown) housed in the cable case 48, the lead wires being connected to a power supply (not shown). The rail members 44a, 44b are mounted parallel to each other on one side of the rail member 62. The rail members 44a, 44b have longitudinal ridges 68a, 68b (FIG. 4), respectively, on their opposite sides facing upwardly and downwardly, respectively. A rack 70 is disposed between the rail members 44a, 44b, more closely to the rail member 44a than to the rail member 44b. The X-axis unit 46 is movably mounted on the X-axis rail unit 42 thus constructed.

Figure 3:
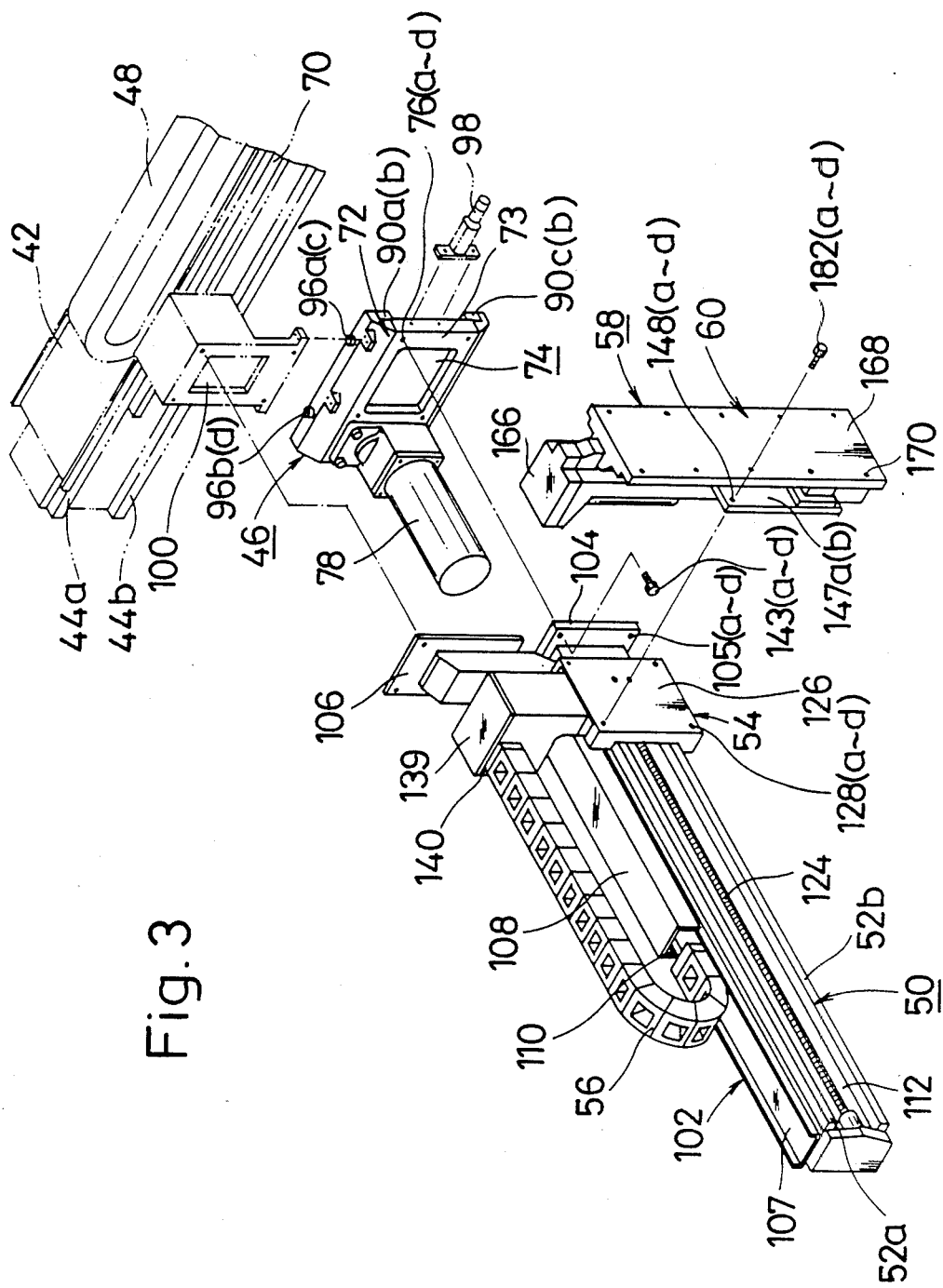
FIG. 3 is a fragmentary exploded perspective view of the robot apparatus of the present invention.

As illustrated in FIG. 3, the X-axis unit 46 includes a base 72 having an attachment surface 73 with a substantially rectangular opening 74 defined centrally therein. The opening 74 serves as a clearance space for mounting the Y-axis slide unit 50 on the attachment surface 73. Threaded holes 76a through 76d are defined in opposite edges of the attachment surface 73. A servomotor 78 is mounted as by bolts on the base 72, the servomotor 78 having a rotatable drive shaft 80 (FIG. 4) on wihch a first gear 82 is mounted. The first gear 82 is held in mesh with a second gear 84 supported on one end of a rod 86, the opposite end of which supports a pinion 88 meshing with the rack 70. The rod 86 is rotatably mounted in the base 72.

Guide members 90a through 90d are fixed by bolts (not shown) to vertically opposite edges of the base 72. The guide members 90a through 90d have grooves 94a defined in end surfaces thereof and through 94d, respectively, in which the ridges 68a, 68b of the rail members 44a, 44b are fitted. Adjustment screws 96a through 96d are threaded through the vertically opposite edges of the base 72 for adjusting the fitting engagement between the guide members 90a through 90d and the rail members 44a, 44b. A stopper member 98 having a position detecting mechanism is fixed to a side of the base 72, and a connecting member 100 is mounted as by bolts on the upper end of the base 72. The end of the cable case 48 remote from the terminal box 64 is connected to the connecting member 100 which is attached to the X-axis unit 46. The cable case 48 is flexible in order to accomodate the movement of the X-axis unit 46 on the X-axis rail unit 42. Similarly, the cable case 56 is flexible in order to accomodate the movement of the Y-axis slide base 54 on the Y-axis slide unit 50. The lead wires (not shown) coupled to the servomotor 78 extend through the connecting member 100 and are housed in the cable case 48.

For assembly, the guide members 90a, 90b and 90c, 90d are held against the rail members 44a, 44b, respectively, of the X-axis rail unit 42 with the ridges 68a, 68b fitted respectively in the grooves 94a, 94b and 94c, 94d. The pinion 88 is brought into mesh with the rack 70, and the X-axis unit 46 is mounted on the X-axis rail unit 42. The Y-axis slide unit 50 is mounted on the X-axis unit 46.

Figure 5:
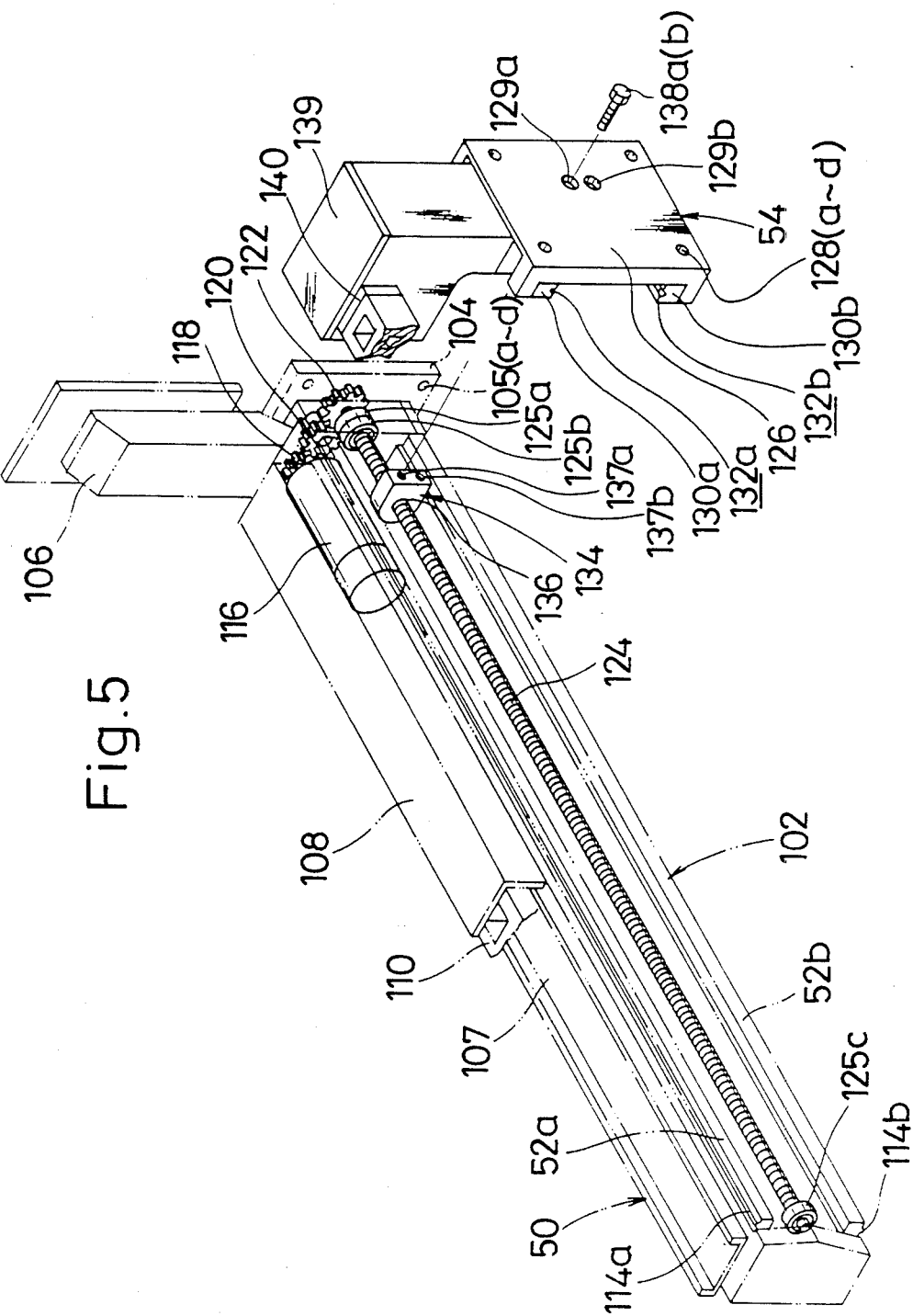
FIG. 5 is a fragmentary exploded perspective view of a Y-axis slide unit of the robot apparatus.

More specifically, the Y-axis slide unit 50 comprises a body 102 (FIG. 3) including an attachment 104 on one end thereof, the attachment 104 having bolt insertion holes 105a through 105d corresponding respectively to the threaded holes 76a through 76d of the base 72. An upper cover 106 is fixed to the upper end of the attachment 104. A cover member 108 is mounted on the upper surface 107 of the body 102. One end of the cable case 56 is joined to a fixing member 110 secured to the upper surface 107. The body 102 includes a side 112 having its central portion oriented longitudinally and bent inwardly, the rail members 52a, 52b being disposed parallel to each other on the upper and lower ends of the bent side 112. As shown in FIG. 5, the rail members 52a, 52b have ridges 114a, 114b respectively on upper and lower sides thereof.

A servomotor 116 is mounted in the body 102 and has a rotatable drive shaft (not shown) to which a third gear 118 is fixed. The third gear 118 is held in mesh with a fourth gear 120 meshing with a fifth gear 122 supported on one end of a screw shaft 124 having a helical thread defined on its outer peripheral surface. The screw shaft 124 extends in a space or opening defined by the inwardly bent side 112. The opposite ends of the screw shaft 124 are rotatably mounted on the body 102 by bearings 125a, 125b and a bearing 125c, respectively. The lead wires connected to the servomotor 116 pass through the upper cover 106 and the connecting member 100 and are accommodated in the cable case 48.

The Y-axis slide base 54 is mounted on the body 102. The Y-axis slide base 54 has, on one side thereof, an attachment 126 for mounting the Z-axis slide unit 58 thereon, the attachment 126 having threaded holes 128a through 128d defined in its corners. The attachment 126 also has substantially central bolt insertion holes 129a, 129b. Guide members 130a, 130b are fixed to vertically opposite edges of the Y-axis slide base 54. The guide members 130a, 130b have grooves 132a, 132b, respectively, in which the corresponding ridges 114a, 114b are fitted. A nut member 134 is mounted substantially centrally on the Y-axis slide base 54, the nut member 134 having a threaded hole 136 in which the screw shaft 124 threadedly extends and threaded holes 137a, 137b of given depth aligned respectively with the bolt insertion holes 129a, 129b of the attachment 126.

Bolts 138a, 138b are inserted through the bolt insertion holes 129a, 129b and have their tip ends threaded into the respective threaded holes 137a, 137b of the nut member 134 to fasten the nut member 134 to the Y-axis slide base 54. A connector box 139 is mounted on the upper end of the Y-axis slide base 54, and an attachment 140 is disposed on an upper side edge of the connector box 139.

For assembly, the guide members 130a, 130b are brought into engagement with the rail members 52a, 52b, respectively, and the screw shaft 124 is threaded through the threaded hole 136 of the nut member 134. The other end of the cable case 56 is fixed to the attachment 140 to mount the Y-axis slide base 54 on the body 102. Bolts 143a through 143d are inserted through the holes 105a through 105d of the attachment 104, and their tip ends are threaded into the threaded holes 76a through 76d of the base 72 to fasten the Y-axis slide unit 50 to the X-axis unit 46. The Z-axis slide unit 58 is mounted on the attachment 126 of the Y-axis slide base 54.

Figure 6:
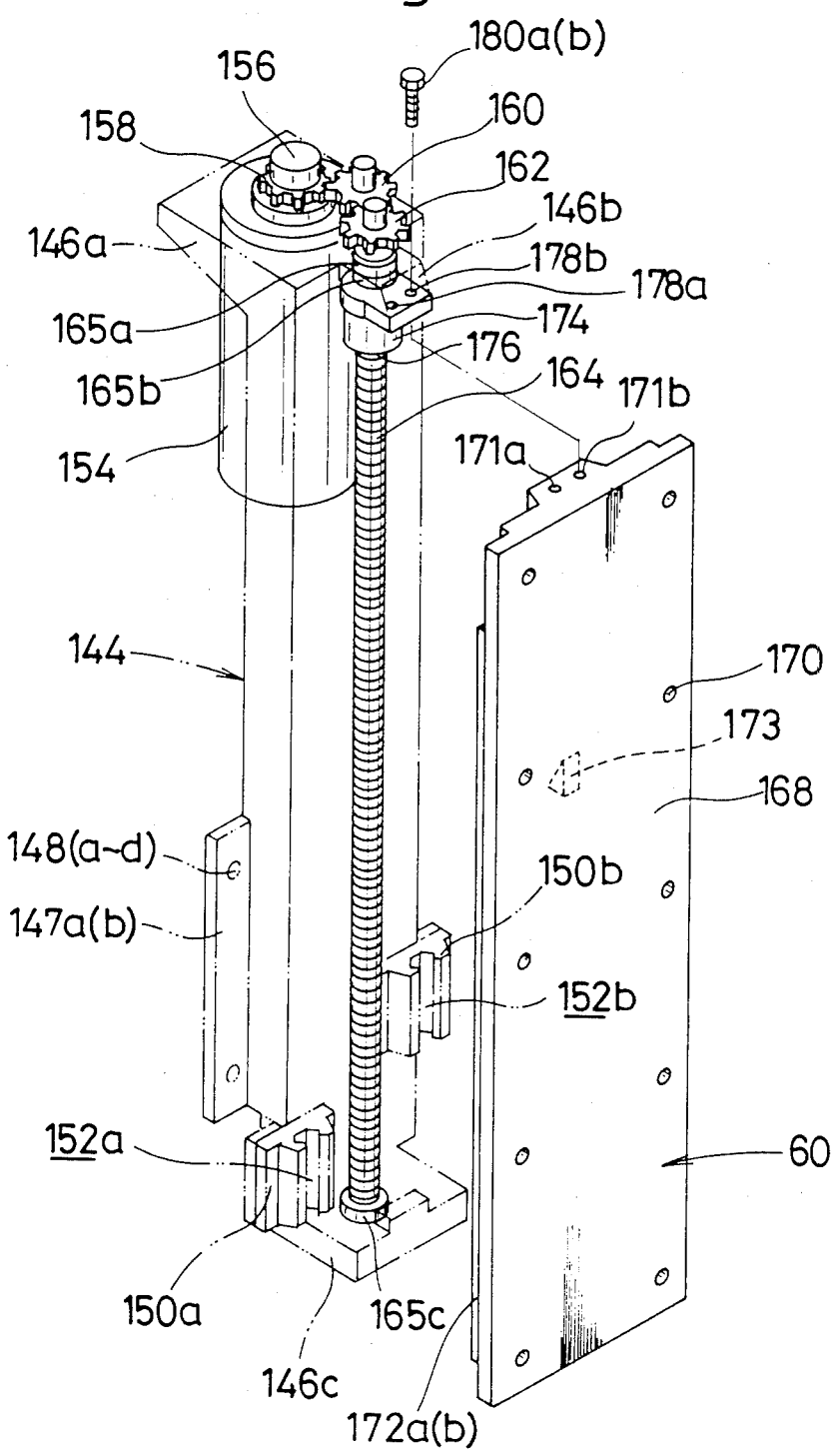
FIG. 6 is a fragmentary exploded perspective view of a Z-axis slide unit of the robot apparatus.

As illustrated in FIG. 6, the Z-axis slide unit 58 comprises a body 144 having ledges 146a, 146b projecting outwardly away from each other on one longitudinal end thereof, and another ledge 146c on the other longitudinal end, projecting in the same direction as that in which the ledge 146b projects. The body 144 has attachments 147a, 147b respectively on opposite sides thereof, the attachments 147a, 147b having bolt insertion holes 148a through 148d corresponding respectively to the threaded holes 128a through 128d of the Y-axis slide base 54. The body 144 also has guide members 150a, 150b fixed thereto near the ledge 146c and having slots 152a, 152b, respectively, of bent cross-sectional configuration.

A servomotor 154 is mounted on the ledge 146a and has a rotatable drive shaft 156 to which a sixth gear 158 is fixed. The sixth gear 158 meshes with a seventh gear 160 rotatably mounted on the body 144 and held in mesh with an eighth gear 162 supported on one end of a screw shaft 164. The screw shaft 164 is rotatably mounted on the body 144 by means of bearings 165a, 165b and a bearing 165c which are mounted on the ledges 146b, 146c, respectively. A cover 166 (FIG. 3) is mounted on the ledges 146a, 146b. The lead wires and cords connected to the servomotor 154 extend through the connector box 139 and are housed in the cable case 56, and also extend through the connecting member 100 and are housed in the cable case 48, with the terminal ends connected to the terminal box 64.

The Z-axis slide base 60 substantially in the form of a plate is mounted on the body 144. The Z-axis slide base 60 has on one side thereof an attachment 168 in which a plurality of spaced threaded holes 170 are defined. Threaded holes 171a, 171b for mounting a nut member (described below) are defined in one longitudinal end of the Z-axis slide base 60. An engagement member 173 projecting outwardly is disposed in a prescribed position on the reverse side of the attachment 168. Guide members 172a, 172b are also mounted on the reverse side of the attachment 168, the guide members 172a, 172b being parallel to each other. The guide members 172a, 172b are shaped complementarily to the cross-sectional shapes of the slots 152a, 152b of the guide members 150a, 150b.

A nut member 174 is mounted on the end of the Z-axis slide base 60 in which the threaded holes 171a, 171b are defined. More specifically, the nut member 174 has an axial threaded hole 176 and bolt insertion holes 178a, 178b corresponding respectively to the threaded holes 171a, 171b of the Z-axis slide base 60. The nut member 174 is fastened to the Z-axis slide base 60 by inserting bolts 180a, 180b through the bolt insertion holes 178a, 178b threadedly into the threaded holes 171a, 171b, respectively. The screw shaft 164 extends threaded through the threaded hole 176, and the guide members 172a, 172b of the Z-axis slide base 60 are brought into engagement with the guide members 150a, 150b of the body 144 to mount the Z-axis slide base 60 on the body 144. Bolts 182a through 182d (FIG. 3) are inserted through the bolt insertion holes 148a through 148d of the attachments 147a, 147b and threaded into the threaded holes 128a through 128d of the attachment 126, thus mounting the Z-axis slide unit 58 on the Y-axis slide base 54.

The robot apparatus of the present invention is basically constructed as described above. Operation and advantages of the robot apparatus will be described below.

A robot hand (not shown) is mounted on the Z-axis slide base 60 of the Z-axis slide unit 58. More specifically, the hand is secured to the attachment 168 at a desired position by bolts threaded into selected ones of the threaded holes 170.

Then, the hand is moved in the directions of the X-, Y-, and Z-axes in the following process:

When the servomotor 78 is energized, the rotatable drive shaft 80 thereof is rotated to rotate the first gear 82 meshing with the second gear 84. Therefore, the rotative power from the servomotor 78 is transmitted through the second gear 84 to the pinion 88. As the pinion 88 is rotated, it rolls on the rack 70 to move the X-axis unit 46 in a selected direction on and along the rail members 44a, 44b. The stopper member 98 mounted on one end of the X-axis unit 46 is effective to limit the movement of the X-axis unit 46 to a prescribed range. Therefore, the X-axis unit 46 is moved in the selected direction on and along the X-axis rail unit 42 in response to operation of the servomotor 78.

When the servomotor 116 of the Y-axis slide unit 50 is energized, the rotatable drive shaft thereof (not shown) is rotated to rotate the third gear 118 meshing with the fourth gear 120 which meshes with the fifth gear 122. Consequently, the rotative power from the servomotor 166 is transmitted through the meshing gear train to the screw shaft 124. Upon rotation of the screw shaft 124, the nut member 134 is moved in a selected direction on and along the screw shaft 124 to cause the Y-axis slide base 54 to move on and along the screw shaft 124. Therefore, the Y-axis slide base 54 is moved in a direction normal to the direction of movement of the X-axis unit 46 in response to operation of the servomotor 116.

When the servomotor 154 of the Z-axis slide unit 58 is energized, the rotatable drive shaft 156 thereof is rotated to rotate the sixth gear 158 which causes the seventh gear 160 meshing therewith to rotate the eighth gear 162. Thus, the screw shaft 164 supporting the eighth gear 162 is rotated to enable the nut member 174 to move the Z-axis slide base 60 in a selected direction. Since the guide members 172a, 172b on the Z-axis slide base 60 are guided by the guide members 150a, 150b on the body 144, the Z-axis slide base 60 can smoothly be moved. The engagement member 173 on the Z-axis slide base 60 limits movement of the Z-axis slide base 60 by engaging the ledge 146c of the body 144.

The robot hand can therefore be moved desired distances in the three mutually perpendicular directions of the X-, Y-, and Z-axes to feed a workpiece (not shown) gripped by the hand to a desired three-dimensional position.

With the robot apparatus arranged as above, the X-axis unit 46, the Y-axis slide unit 50, and the Z-axis slide unit 58 are prevented from interfering with the tracks of other units. More specifically, the rail members 44a, 44b of the X-axis rail unit 42 and the rail members 52a, 52b of the Y-axis slide unit 50 extend horizontally, but not vertically. Accordingly, a space available directly below the robot apparatus can effectively be utilized. Since the lead wires connected to the rotative drive sources, i.e., the servomotors 78, 116, are accommodated in the cable case 48, and the lead wires connected to the servomotor 154 is housed in the cable cases 56, 48, the lead wires are also prevented from interfering with the movement of the units. Where a device or the like is to be arranged parallel to the X-axis rail unit 42, or the distance of movement of the robot apparatus in the Y-axis direction is small, the Z-axis slide unit 58 may be replaced with a rail member extending in the Z-axis direction, and the Y-axis slide unit 50 may be replaced with a mechanism identical to the Z-axis slide unit 58. Inasmuch as the X-axis unit 46 is moved by the servomotor 78 mounted thereon, a plurality of X-axis units 46 may be mounted on the single X-rail unit 42. The stopper member 98 on each of such plural X-axis units 46 serves to prevent the X-axis units 46 from interfering with each other, with the result that feeding operation can appropriately be performed by the robot apparatus.

With the arrangement of the present invention, as described above, the robot apparatus is movable in the directions of the three axes of a Cartesian coordinate system, and eliminates one of the rail members that the conventional robot apparatus have had in the direction of one axis. Because a plurality of robot units can be mounted on a single rail unit, a limited working space available to the user of the robot apparatus can effectively be utilized, and the working envelope of the robot apparatus is increased. The units are driven by the rack and pinion and the screw shafts with the nuts threaded thereon, with the consequence that the positioning accuracy of the robot apparatus remains high for a long period of time and the robot apparatus is durable and can continuously be used for a prolonged period of time. As a result, the efficiency of operation of the robot apparatus is increased so as to make the robot apparatus suitable for mass-production applications.

The X-axis slide unit, the Y-axis slide unit, and the Z-axis slide unit may be of other constructions than illustrated.

Although a certain preferred embodiment has been shown and described, it should be understood that many changes and modifications may be made therein without departing from the scope of the appended claims.

What is claimed is:

1. A robot apparatus comprising
a rail unit including a rail extending in the direction of an axis of a Cartesian coordiante system having X-, Y- and Z-axes,
an X-axis slide unit movable in a first direction on said rail unit,
a Y-axis slide unit mounted on said X-axis slide unit and movable in a second direction normal to said first direction,
a Z-axis slide unit mounted on said Y-axis slide unit and movable in a third direction normal to said first and second directions,
said X-axis slide unit having an X-axis drive mechanism, said Y-axis slide unit having a Y-axis drive mechanism, and said Z-axis slide unit having a Z-axis drive mechanism,
said rail unit including a first pair of parallel horizontal rail members which are vertically spaced from each other, said X-axis slide unit being mounted on said first pair of parallel horizontal rail members,
said Y-axis slide unit including a second pair of parallel horizontal rail members which are vertically spaced from each other,
a Y-axis slide base being mounted on said second horizontal rail members, and
said Z-axis slide unit being fixed to said Y-axis slide base.

2. A robot apparatus as recited in claim 1 where each rail member of said first pair of parallel horizontal rail members has a longitudinal ridge thereon.

3. A robot apparatus as recited in claim 2 wherein said first pair of parallel horizontal rail members includes an upper rail member having an upper surface and a lower rail member having a bottom surface,
said longitudinal ridge on said upper rail member being located on said upper surface, and
said longitudinal ridge on said lower rail member being located on said bottom surface.

4. A robot apparatus as recited in claim 2 wherein said X-axis slide unit includes grooves which mate with said longitudinal ridges.

* * * * *